Patented Mar. 8, 1932

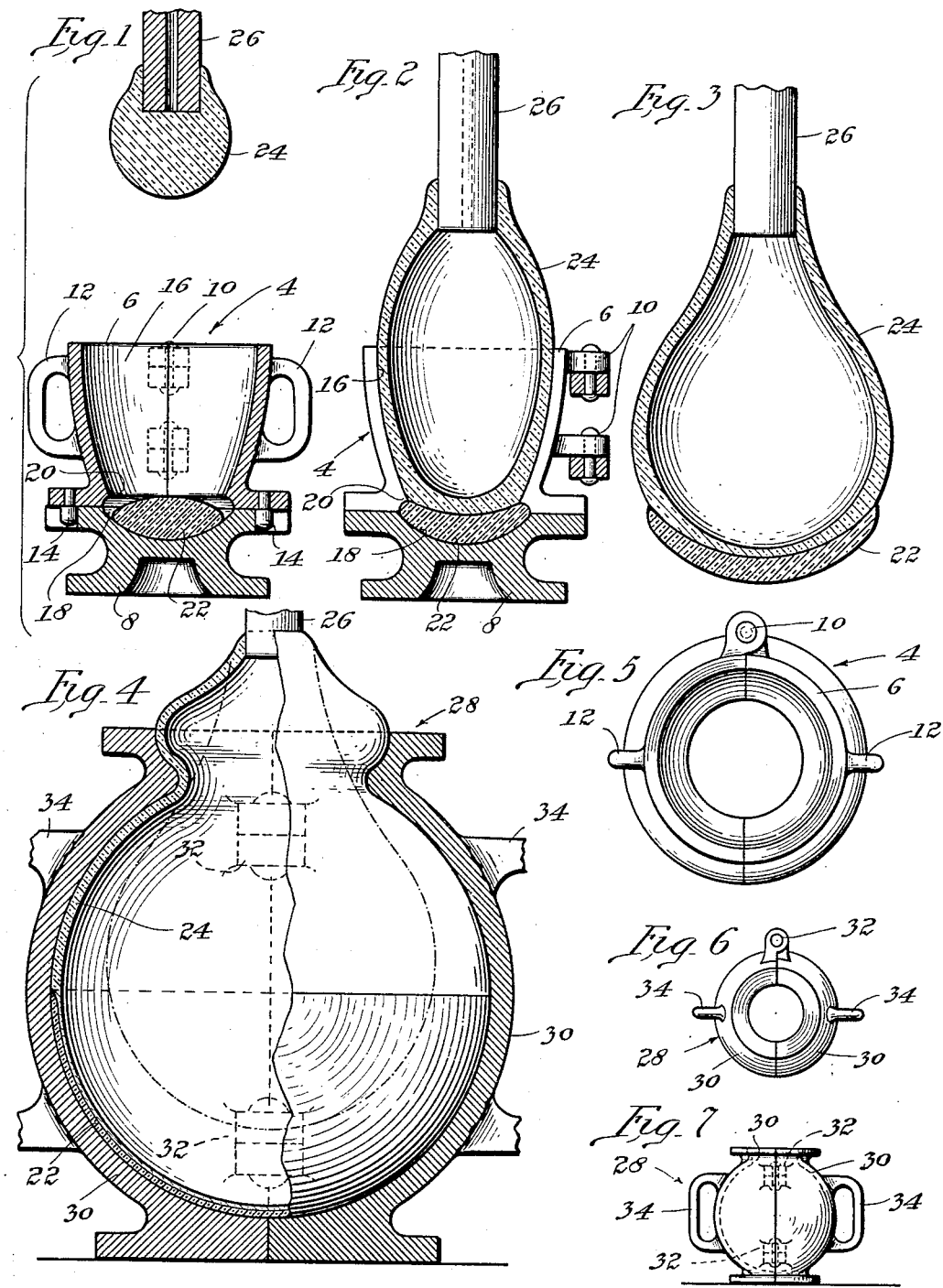
March 8, 1932.    J. EMERSON    1,848,467
MOLDING APPARATUS
Filed April 28, 1928
Inventor
John Emerson
By Cheever & Cox
Attys.

1,848,467

UNITED STATES PATENT OFFICE

JOHN EMERSON, OF CHICAGO, ILLINOIS, ASSIGNOR TO INLAND GLASS WORKS, INC., OF CHICAGO, ILLINOIS, A CORPORATION OF ILLINOIS

MOLDING APPARATUS

Application filed April 28, 1928. Serial No. 273,462.

My invention relates to glass molding apparatus and particularly to apparatus for molding glass globes and the like whereby glass material of one color may be united with glass material of another color and formed into a desired shape.

In my copending application relating to glass globes and methods of making them, Serial No. 273,461 filed April 28, 1928, I have set forth certain difficulties which have heretofore been experienced in the manufacture of articles such as glass globes and one of the primary objects of my present invention is to provide molding apparatus which will serve to obviate or overcome these difficulties.

Another and more specific object of my present invention is to provide molding apparatus having a mold cavity for receiving a predetermined quantity of glass of a certain color which is adapted, when a quantity of glass of another color is associated therewith, to effect the union of said glass materials and determine the line of division between the united materials.

A further object of my present invention is to provide molding apparatus which consists of a plurality of molds whereby glass materials may be combined and progressively shaped, one of said molds being adapted to effect the initial union of materials so as to present a distinct and uniform line of demarcation between said materials, and another of said molds being designed to effect the shaping of the glass materials into a desired form.

A still further object of my invention is to provide glass molding apparatus which includes a unitary lower mold section provided with a cavity for receiving a predetermined quantity of molten glass and a split upper mold section cooperating with said lower section to effect the initial union of the predetermined quantity of glass with glass material of another color, a second mold being provided for completing the forming of the united glass materials into a finished article of desired shape.

Still another object of my invention is to provide simple, durable and efficiently operable molding apparatus for applying a very uniform coating of glass of one color upon glass of another color, said apparatus including a mold cavity for receiving a predetermined quantity or globule of colored glass and a quantity of glass of another color, an annular edge portion being provided which serves to determine the line of division when said glass materials are united within the mold.

These and other objects will be more apparent from the following detailed description when considered in connection with the accompanying drawings wherein:

Figure 1 is a central vertical sectional view of a glass mold embodying features of my invention, a predetermined quantity of colored glass being disclosed in association therewith and a quantity of glass depending from a blow-pipe being positioned thereabove;

Figure 2 is a central vertical sectional view of the mold taken at right angles to the section shown in Figure 1, the molten glass on the blow-pipe being shown combined with the predetermined quantity of colored glass;

Figure 3 discloses the combined arrangement of the glass materials after said materials have been removed from the mold shown in Figure 2 and subjected to a further blowing operation;

Figure 4 discloses a central vertical sectional view of another mold which is used to completely shape the combined glass materials, dot and dash lines within the mold being shown to indicate the approximate size of the partially formed globe at the time it is associated with the mold;

Figure 5 is a plan view of the mold shown in Figures 1 and 2;

Figure 6 is a reduced plan view of the mold shown in Figure 4; and

Figure 7 is a front elevational view of the mold shown in Figure 6.

Referring now to the drawings wherein like numerals have been employed to designate similar parts throughout the various figures, it will be observed that one embodiment of my invention resides in a mold which I have indicated generally by the numeral 4. This mold 4 is comprised of an upper split mold section 6 and a lower unitary mold section 8. The upper mold section 6 comprises two companion portions which are hinged at 10, Figure 2 and which are provided with suitable manipulating handles 12, Figure 1. In order to properly associate the mold section 6 with the unitary or base section 8, it is only necessary to swing the companion portions of said sections together by gripping the handles 12 and to carry dowel or guide pins 14 secured to a flange portion of the section 6 into association with suitable openings provided within the base section 8. These guide pins 14 serve to facilitate the proper registration of the cavity 16 presented within the section 6 with a cavity 18 formed within the mold section 8, Figure 1. It will be observed that I provide an annular edge portion 20 at the lower portion of the cavity 16.

In the use of the mold 4 I first deposit a predetermined quantity of molten colored glass 22 within the cavity 18 and then carry another quantity of clear or crystal molten glass 24 supported at the lower extremity of a conventional blow-pipe 26, into association with said glass 22, as clearly shown in Figure 2. The engagement of the glass 24 with the colored glass 22 causes the glass 22 to be forced outwardly into the marginal portion of the cavity 18 and the lower portion of the cavity 16 adjacent thereto and in this instance the annular edge portion 20 determines the line of connection between the combined glass materials. It will also be observed that I introduce sufficient air through the blow-pipe 26 to cause the glass 24 to be carried into association with the walls of the upper mold section 6. After the combined materials have been partially shaped in the manner described it is only necessary, in order to permit the removal of said material from the mold, to again manipulate the handles 12 so as to swing the companion portions of the mold section 6 outwardly.

Attention is now directed to another molding unit which I have designated generally by the numeral 28, Figures 4, 6 and 7. This molding unit 24 is similar in functional characteristics to the mold section 6 just described, in that the unit 28 is comprised of a pair of companion sections 30 which are hinged at 32 and are provided with suitable manipulating handles 34. After the combined glass materials 22 and 24 are removed from the mold 4 additional air is admitted through the blow-pipe 26 and in Figure 3 I have disclosed these combined materials after they have been removed from the mold 4 and subjected to an additional blowing operation. When said combined materials assume the size indicated in outline by the dot and dash lines, Figure 4, the hinged sections 30 of the molding unit 28 are swung together so as to enclose the partially formed globe and upon the introduction of additional air through the blow-pipe 26 said partially formed globe will be molded into its required shape within the molding unit 28, as clearly shown in Figure 4.

From the foregoing it will be understood that the described molding apparatus, which is of very simple design and economical construction, provides a very convenient and effective means for producing multi-colored glass globes. The cavity 18, Figure 1, within the unitary or base mold section 8 is designed to receive a predetermined quantity of colored glass and is so shaped that when the pellet or globule of colored glass 22 is deposited therein, it will of its own self seek a proper central position within said cavity. Hence when the clear or crystal glass 24 is carried into association with the deposited globule 22, said globule will be uniformly spread so as to fill the marginal portion of the cavity 18 as well as the marginal portion of the cavity 16 adjacent thereto. This uniform spreading of the predetermined quantity or globule of colored glass 22 serves to facilitate the termination of the uppermost portion of said glass at the edge or ridge portion 20 of the mold section 6 with the result that a very sharp and uniform line of demarcation is established between the united glass materials. By having the molds 4 and 28 designed as described, successive steps in the molding of the glass globe may be conveniently produced and a globe produced which has a uniform coating of colored glass distributed over the surface of the transparent glass. The uniform distribution of the colored glass by the use of my improved molding apparatus enables the manufacture of multi-colored globes which are of a superior quality from the standpoint of uniform construction and appearance. Obviously the shape of the completed article will determine the shape of the molds which are to be employed, and therefore it should be understood that my invention is not limited to the particular shape of the molds which I have hereinbefore described.

Having thus described my invention, what I claim as new and desire to secure by Letters Patent is:

In molding apparatus for producing glass articles of the class described, an upper split mold section, a lower unitary mold section for supporting the upper split section, a mold cavity being presented by the combined upper and lower sections which is adapted to receive a plurality of quantities of glass materials to be combined, said cavity having an inwardly extending projection for limiting the displacement of molten glass material to thereby produce a sharp and uniform line of demarcation between the materials associated therewith, and a split mold for receiving the materials formed by the first mentioned mold, adapted to complete the shaping of said combined materials.

In witness whereof, I have hereunto subscribed my name.

JOHN EMERSON.